(12) United States Patent  
Pering et al.

(10) Patent No.: US 8,903,315 B2
(45) Date of Patent: Dec. 2, 2014

(54) SECURE CONTEXT-BASED COMPUTING

(75) Inventors: Trevor Pering, San Francisco, CA (US); Meiyuan Zhao, Santa Clara, CA (US); Branislav Kveton, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 658 days.

(21) Appl. No.: 13/171,939

(22) Filed: Jun. 29, 2011

(65) Prior Publication Data

US 2013/0005255 A1 Jan. 3, 2013

(51) Int. Cl.
| | |
|---|---|
| *H04B 7/00* | (2006.01) |
| *H04W 4/00* | (2009.01) |
| *H04B 5/00* | (2006.01) |
| *H04W 12/02* | (2009.01) |

(52) U.S. Cl.
CPC .............. *H04W 4/008* (2013.01); *H04W 4/005* (2013.01); *H04B 5/00* (2013.01); *H04W 12/02* (2013.01)
USPC ........................... 455/41.2; 455/410; 455/411

(58) Field of Classification Search
CPC ..... H04W 12/00; H04W 12/06; H04W 12/08; H04W 12/10
USPC .......................................... 455/410, 411, 41.2
See application file for complete search history.

(56) References Cited

U.S. PATENT DOCUMENTS

| | | | | |
|---|---|---|---|---|
| 8,171,528 | B1 * | 5/2012 | Brown .............................. | 726/3 |
| 2005/0149443 | A1 * | 7/2005 | Torvinen ......................... | 705/51 |
| 2006/0224885 | A1 * | 10/2006 | Lillie et al. .................... | 713/153 |
| 2007/0140145 | A1 * | 6/2007 | Kumar et al. .................. | 370/254 |
| 2007/0233860 | A1 * | 10/2007 | Lillie et al. ..................... | 709/225 |
| 2008/0028225 | A1 * | 1/2008 | Eckert et al. ................... | 713/182 |
| 2009/0327724 | A1 * | 12/2009 | Shah et al. ..................... | 713/169 |
| 2010/0064350 | A1 * | 3/2010 | Dondeti et al. .................... | 726/4 |

OTHER PUBLICATIONS

Wikipedia, "Web of Trust," http://en.wikipedia.org/wiki/Web_of_trust, 1 page, 2011.
Wikipedia, "Digital Rights Management," pp. 1-20, Jun. 10, 2011.
Bump Technologies, Inc., "The Bump App for iPhone and Android, Frequently Asked Questions," pp. 1-4, 2011.
Wikipedia, "Mel-Frequency Cepstrum," http://en.wikipedia.org/wiki/Mel-frequency_cepstrum, pp. 1-3, Apr. 11, 2011.
Wikipedia, "Public Key Certificate," http://en.wikipedia.org/wiki/Public_key_certificate, pp. 1-6, Jun. 3, 2011.
International Searching Authority, "Notification of Transmittal of the International Search Report and the Written Opinion of the International Searching Authority," mailed Jan. 21, 2013, in International application No. PCT/US2012/044731.

* cited by examiner

*Primary Examiner* — April G Gonzales
(74) *Attorney, Agent, or Firm* — Trop, Pruner & Hu, P.C.

(57) ABSTRACT

An embodiment of the invention includes an article with instructions that enable a first unit to: (a) sense the first unit's local surroundings to determine sensed data; (b) receive and decrypt encrypted context data directly from a second unit (the second unit located nearby the first unit and the context data corresponding to the first unit's local surroundings); and (c) based on the sensed data and the decrypted context data, communicate directly with the second unit. Other embodiments are described herein.

20 Claims, 4 Drawing Sheets

SECURE CONTEXT-BASED COMPUTING

BACKGROUND

With context-based computing a person with a Smartphone may wish to exchange his phone number with another person that also has a Smartphone. If the two users are nearby one another, they may "bump" their phones together thereby generating environmental "context" data (e.g., accelerometer data) related to the bump. Each phone may sense the environmental data and then transmit sensed environmental data to a remote server. The server may then compare the sensed data from each device to determine if the two smart phones are truly nearby one another (i.e., each phone recorded similar environmental data that would be available to phones that participated in the bump). If the server determines there to be a sufficient match of the sensed data from each phone, the phones may be deemed to be local to one another. The phones may then be permitted to communicate additional data (e.g., phone numbers) indirectly to one another, based on this established link, via the server. Alternatively, systems may send the sensed environmental information directly between the two devices "in the clear" (e.g., without encryption). However, either of the above systems may have data security risks, privacy risks, or may suffer lags on device performance due to indirect data routing via a remote server.

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same embodiment.

Various embodiments of the invention address the security of context-based computing by allowing collocated devices (i.e., located nearby each other) to securely share context sensory information. In one embodiment, a "sensor trust broker" (STB) provisions the devices with security mechanisms (e.g., security keys). The devices may sense their environment by sensing, for example, a sound that all collocated devices would have heard if they were truly located nearby each other. To prove each device "heard" the same sound (and that the devices are indeed collocated) the collocated devices may use the STB provisioned keys to encrypt and then share with each other the sound (and/or information derived from the sound) that each device heard. This information may be shared in a peer-to-peer manner among all the truly collocated devices without having to route the information through an intermediate server (that may lose connectivity with the devices over time). Also, because the sensory information that is shared is secure based on the STB provisioned keys, another nearby device (that are near but not truly collocated with the other devices) cannot wrongly appropriate the sensory information (e.g., an auditory signature of the sound in question) and use the ill-gotten information to wrongly interject itself into communications meant for the other collocated devices. In addition, the collocated devices can exchange sensory information even while being relatively "unknown" to one another at the time of "meeting" up with each other.

Figure 1:
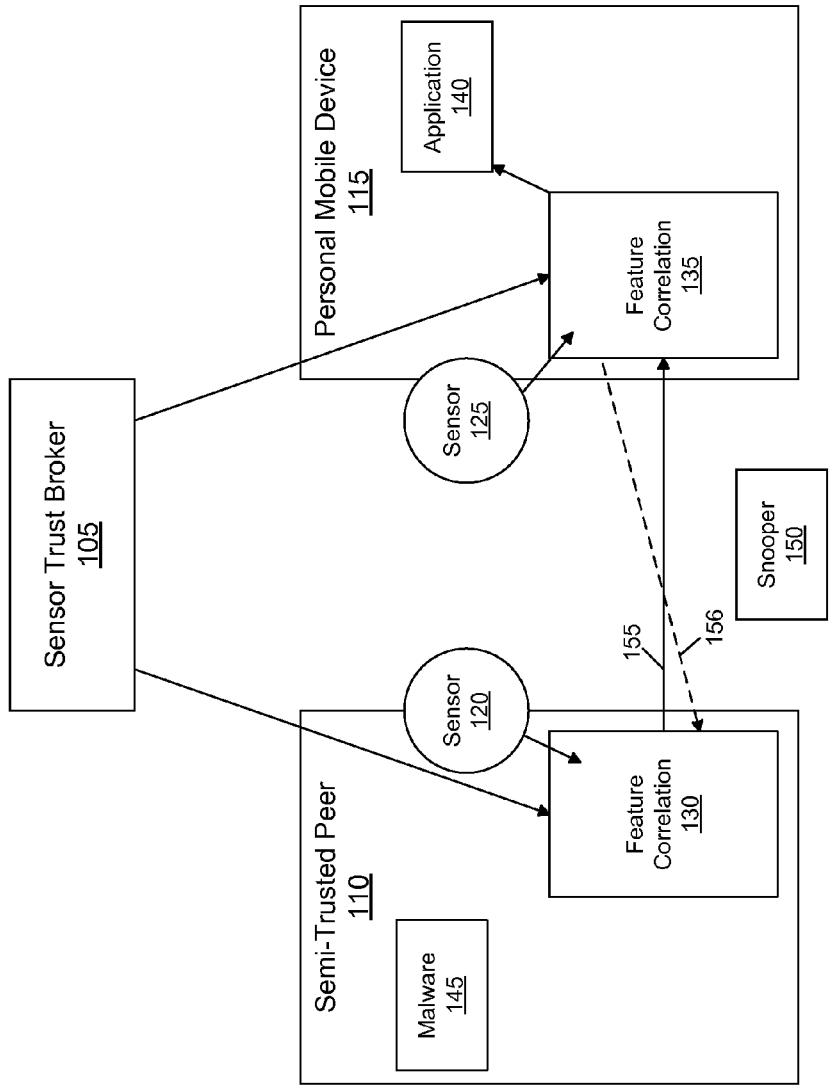
FIG. 1 includes a system in one embodiment of the invention.

FIG. 1 includes a system in one embodiment of the invention. In system 100 sensor trust broker 105 (STB) couples to units 110, 115. Units 110, 115 may include, for example, tablets, Smartphones, personal digital assistants (PDAs), handheld wireless devices, laptops, desktops, notebooks, and the like. Units 110, 115 may respectively include sensors 120, 125 to sense environmental data. Such sensors may include, for example, microphones, cameras, pressure transducers, accelerometers, piezoelectric chips, GPS devices and the like to sense data such as, for example, any combination of auditory, visual, pressure, vibratory, location (e.g., GPS), tactile sensory data, and/or other contextual information. Units 110, 115 may communicate with each other (peer to peer) via paths 155, 156. Each unit may also communicate with various applications, such as application 140, which may be, for example, a picture sharing application or any number of other data-sharing applications. Software 130, 135 will be addressed below.

Figure 2:
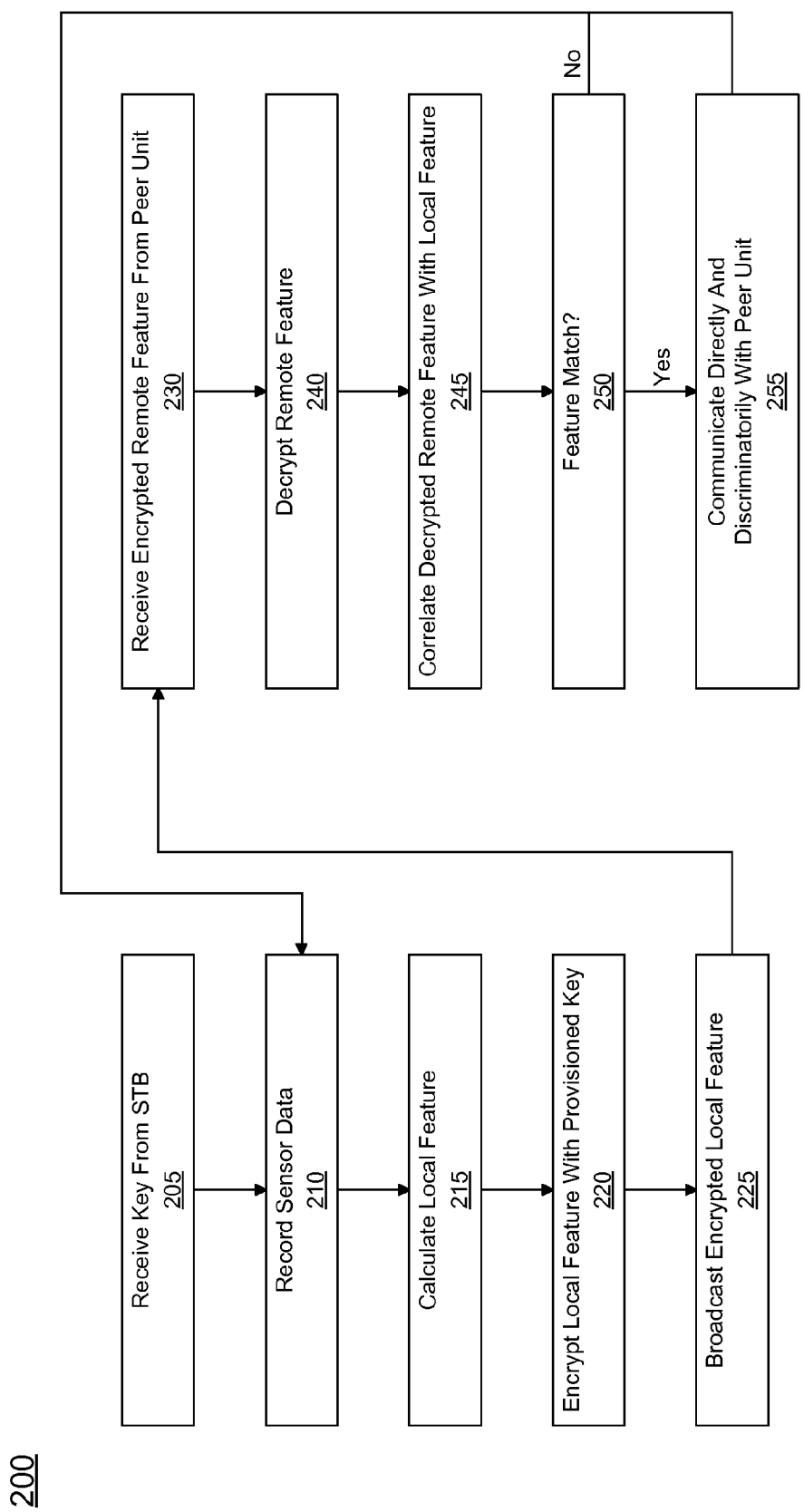
FIG. 2 includes a process in an embodiment of the invention.

FIG. 2 includes a method in an embodiment of the invention. Method 200 may be used with system 100 but is not limited thereto. However, for clarity one embodiment of method 200 is discussed immediately below in cooperation with system 100.

In block 205 first unit 110 may receive an encryption key from a remotely located key provisioning unit, such as STB 105 included on a server. Second unit 115 may also receive an encryption key from STB 105. Units 105, 110 need not receive the keys directly from any one server considering access to STB 105 may be over the internet, which may introduce routers, intermediate servers, and the like. Units 105, 110 do not need to necessarily even contact the same STB.

Regarding provisioning keys to the units, in an embodiment units 110 and 115 may receive shared encryption keys, via STB 105, enabling a symmetric encryption protocol that enables units to securely share their identity (e.g., phone number, name of a person or an organization, address, e-mail address, instant message (IM) address, Media Access Control (MAC) address, random nonce, and the like) and/or other information with one another. In an embodiment, the STB functions as a key provider. Additionally, method 200 may be used with a web of trust scheme wherein the signature is of a user (e.g., self-signed certificate) or other users (e.g., "endorsements"). Embodiments are not limited to any one specific provisioning scheme for provisioning unit 110 and/or unit 115 with security tools, such as keys. Other potential schemes include Public Key Infrastructure (PKI) protocols and other conventional provisioning schemes.

Block 210 includes sensing local environmental sensory data. "Local" includes the atmosphere immediately surrounding the unit. For example, sensors 120, 125 (e.g., microphones) may sense and record a sound produced nearby the two units. As mentioned above, embodiments of the invention are not limited to sound and may instead include any number of different sensed information. Still, for clarity sound is used in the present example.

In block 215 each unit may determine a "feature" (i.e., representation) for the sound, such as the mel-frequency cepstrum (MFC). The MFC is a "representation" of the short-term power spectrum of a sound based on a linear cosine transform of a log power spectrum on a nonlinear mel scale of frequency. Mel-frequency cepstral coefficients (MFCCs) are coefficients that collectively make up a MFC and which are derived from a type of cepstral representation of the audio clip. MFCCs may be based on taking the Fourier transform of a signal (or an excerpt of the signal), mapping the powers of the spectrum onto the mel scale (e.g., using triangular overlapping windows), taking the logs of the powers at each of the mel frequencies, and taking the discrete cosine transform of the list of mel log powers. The MFCCs are the amplitudes of the resulting spectrum. MFC is just an explanatory example of a feature that can be used with embodiments of the invention and embodiments of the invention are not limited thereto.

In an embodiment, a feature is included in a feature vector. In other embodiments, the feature may simply include all or just a portion of the actual recorded signal, which may then be transmitted from one unit to another for comparison with locally recorded signals.

In block 220, units 110 and 115 may encrypt the sound features based on the encryption key they were provisioned with in block 205. In the present example, the keys would be the encryption keys for units 110, 115 received from unit 105

In block 225 units 110 and 115 may broadcast the encrypted features. Unit 110 may broadcast directly to unit 115 as a result of "indiscriminately" broadcasting the encrypted feature. In other words, unit 110 may broadcast an encrypted feature to the second unit (and even to any other surrounding units that are not the intended target unit) without foreknowledge of the identity of the second unit with which unit 110 is attempting to interface. For example, when unit 110 broadcasts the encrypted feature it may do so using a data packet. The packet may include the encrypted feature. However, in an embodiment the packet may also include unit 110's ID. The packet may also include a Key ID, which indicates the packet was encrypted with the key provisioned from STB 105. Thus, unit 110 may distribute the packet with knowledge that only those with compatible keys to the STB provisioned key may decrypt the packet. Still, unit 110 does not know the specific identity of the device it may be collocated with. Thus, at the time of broadcast in block 225 unit 110 does not know the collocated device is actually unit 115 (e.g., a unit which has an ID, such as a phone number or e-mail address, that identifies the unit as unit 115). Accordingly, unit 110 indiscriminately broadcasts its data packet.

In block 230, unit 110 may receive an encrypted feature directly from unit 115 without unit 115 having specific foreknowledge of unit 110's ID. Unit 110 may receive the encrypted feature directly from the second unit. In other words, the information is sent peer-to-peer and not via an intermediate server. Also, as seen in FIG. 1 unit 115 is separate from but locally nearby unit 110. In addition, unit 115 receives the encrypted feature from unit 110. Both units 110, 115 indiscriminately broadcast their respective versions of encrypted features such that surrounding devices may also receive the encrypted messages.

In block 240 units 110, 115 decrypt the respective features. Thus, unit 110 may encrypt its version of the feature with the assigned key (provided via TSB 105) and then transmit the encrypted feature indiscriminately. Unit 115 is then capable of decrypting the feature because unit 115 has the corresponding key used to encrypt the data. Likewise, unit 115 may encrypt the feature with the assigned key (provided via TSB 105) and then transmit the encrypted feature indiscriminately. Unit 110 is then capable of decrypting the feature because unit 110 has the corresponding key used to encrypt the data.

In block 245, unit 110 may use feature correlation software 130 to correlate the decrypted remote feature from unit 115 with the local feature determined by unit 110. For example, unit 110 may compare the features. If there is a "match" to a reasonable extent, units 110 and 115 may be determined to be truly local to one another (i.e., collocated) and consequently, the intended co-communicants. Unit 115 may use similar correlation software 135 to compare sensory based information.

As indicated in block 250, if there is no feature match units 110, 115 may return to block 210 to commence sensing again. However, if there is a match (as determined by one or both of units 110, 115) communication between devices 110, 115 may continue.

In block 255, units 110 and 115 may directly communicate with one another. For example, the units may exchange documents, contact information, video, audio, and the like. As another example, the units may exchange various forms of their IDs, such as their respective phone numbers, thereby allowing the devices to engage in direct discriminate Short Message Service (SMS) text communications. Such communications may be unsecured now that they are being communicated discriminately (i.e., to a known address). In other words, unit 110 may now know the ID of the collocated device. Put another way, unit 110 may know the other device has the ID for unit 115. Consequently, unit 110 may discriminately send information to a specific unit by addressing the communication based on the ID for unit 115. Thus, the information is sent discriminately.

While in some embodiments data exchange is no longer encrypted, in other embodiments the communications may continue in an encrypted format based on keys from STB 105 (or keys derived therefrom).

In one embodiment a direct secure channel may be created based on the comparison of context data in block 205. For example, knowing there is a feature match (e.g., of whatever level of match is determined sufficient by the user) may prompt unit 110 to wrap a session key with the shared encryption key and transmit that session key to unit 115. This may be facilitated by unit 110 now knowing the ID of unit 115 if, for example, the ID was affixed to feature information sent by unit 115. Units 110 and 115 may then directly communicate via a secured path based on the jointly held session key (i.e., without having to use a remote server as a performance degrading intermediary that provides indirect communication between the devices).

In an embodiment, inter-device communications between units 105, 110 along a direct secure channel may continue for a prolonged period of time (e.g., using a session key or keys derived therefrom). While relying upon prolonged access to a Wi-Fi connection (to continuously route data between the two units) may be problematic, the peer-to-peer secure communications described herein does not necessarily require a prolonged Wi-Fi connection.

As another example of a method in an embodiment of the invention, devices 110, 115 may be collocated with one another and may wish to securely exchange information with one another. However, another device, such as snooper unit 150 (or malware 145 and the like), may be located nearby devices 110, 115 and may wish to wrongly intercept information exchanged between devices 110, 115. Unit 110 may have an ID such as ID110, unit 115 may have an ID such as ID115, and unit 150 may have an ID such as ID150. STB 105 may freely provision keys to units 110, 115 and possibly even unit 150.

With this in mind, devices 110 and 115 may engage in activity whereby a noise is sensed by both devices. Unit 110 may determine a noise vector Va for the noise and unit 115 may determine a noise vector Va' for the noise. Unit 150 determines no noise vector because unit 150 was not actually collocated with units 110, 115 and thus was not privy to the noise.

Unit 110 may securely bind Va to ID110 and then indiscriminantly broadcast Va/ID110 to unit 110's surroundings, thereby broadcasting the information to units 115 and 150. Unit 115 may securely bind Va' to ID115 and then indiscriminantly broadcast Va'/ID115 to unit 115's surroundings, thereby broadcasting the information to units 110 and 150. Unit 150 has no vector to broadcast because it was not collocated with devices 110, 115.

Unit 110 may then compare Va and Va'. If unit 110 determines a sufficient level of match between Va and Va', unit 110 may choose to directly and discriminately send data (e.g., a phone number, a file, and the like) and/or receive data to or from a device having ID115 (i.e., the unit 115 ID bound to Va'). Similarly, if unit 115 determines a sufficient level of match between Va and Va', unit 115 may choose to directly and discriminately send data and/or receive data to or from a device having ID110 (i.e., the unit 110 ID bound to Va). In an embodiment, session keys and the like may be exchanged between units 110 and 115 to further facilitate secure channel communications.

Regarding unit 150, unit 150 may decrypt Va or Va' if it has acquired a complementary key to the keys provisioned by STB. However, unit 150 may be prevented from forwarding Va or Va' because Va and Va' may be subject to protection (e.g., encryption) based on, for example and without limitation, conventional Digital Rights Management (DRM) techniques (e.g., Content Scrambling System (CSS), Protected Media Path (PMP), Advanced Access Content System (AACS), Content Protection and Copy Management (DVB-CPCM), Mobipocket, Topaz, ePub, and/or many other forms/derivatives of or to DRM). In such a case, unit 150 may be able to decrypt Va or Va' but unable to then pass off (e.g., forward) such information as its own rendering of originally sensed noise. In other words, unit 150 may read Va and Va' but cannot forward Va or Va'. Consequently, units 110 and 115 may develop a level of trust with another. However, because unit 150 cannot generate its own vector, and cannot pass off Va or Va' as its own vector, unit 150 can never have a vector (coupled to its ID) compared with another genuine vector (e.g., Va or Va') by target devices such as 110 and 115. Thus, units 110 and 115 will not be fooled into developing a trusted relationship with unit 150. Based on the trusted relationship and the exchange of trusted IDs between units 110 and 115, units 110 and 115 may directly communicate with each other (e.g., using one another's phone number, email address, and the like). The communicated data may be encrypted or unencrypted.

In an embodiment, a unit such as unit 110 may receive an ID from a unit, such as unit 115, and then use that ID to discriminately communicate not with unit 115 itself but instead, for example, with an e-mail address. For example, unit 115 may transmit a packet to unit 110. That packet may include an ID for unit 115 such as, for example, an e-mail address for a user of unit 115. Unit 110 may discriminately send data to that e-mail address. Thus, unit 110 would discriminately communicate with the e-mail address, which is not necessarily accessed via unit 115 (but may instead be accessed from a remote computing terminal). In this example, unit 110 uses the ID to discriminately communicate with something other than unit 115.

In an embodiment, unit 110 may simply accumulate an ID in, for example, a data packet from unit 115 and not necessarily communicate any future data based on the ID. Such a scenario may simply promote gathering of IDs by unit 110 in a direct and secure manner from devices like unit 115.

Figure 3:
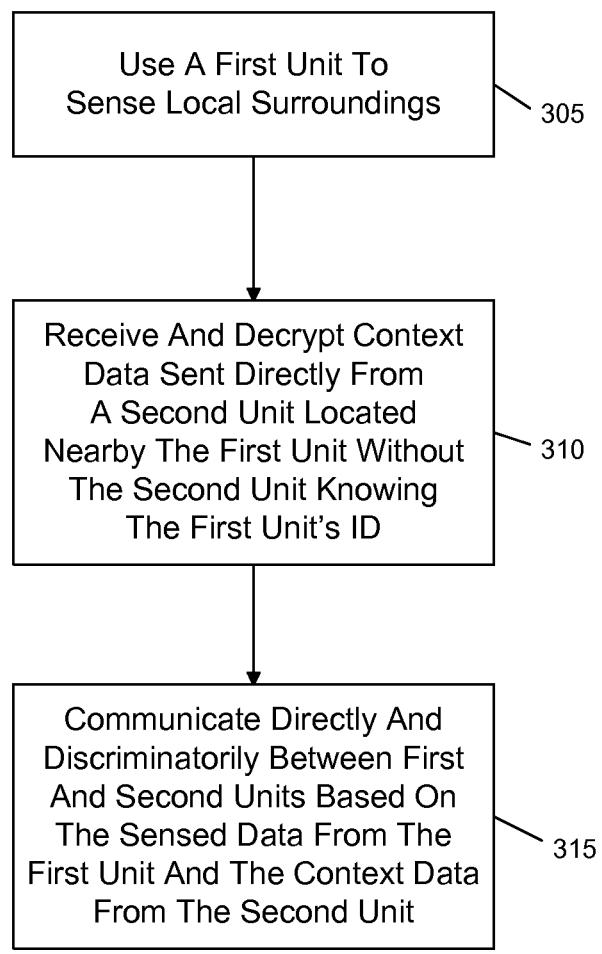
FIG. 3 includes a process in an embodiment of the invention.

FIG. 3 includes a method to be practiced by a unit, such as a PDA, Smartphone, or the like in an embodiment of the invention.

Block 305 includes the unit sensing its local surroundings to determine sensed data. The unit may do so using sensors that include, for example, microphones, cameras, pressure transducers, accelerometers, piezoelectric chips, GPS devices and the like to sense any combination of data such as auditory, visual, pressure, vibratory, location (e.g., GPS), tactile sensory data and other contextual information.

Block 310 includes the first unit receiving and decrypting encrypted context data directly (i.e., peer-to-peer) from a second unit. The second unit may be separate from but located nearby the first unit. The context data may correspond to the first unit's local surroundings considering the first and second units may be collocated. Again, context data may be related to vibrations, audio, or general forces induced by a "bump" between the first and second units (e.g., a vector force corresponding to impact of a certain amount of force proceeding along a certain course), a sound heard by both units, an image seen by both units, and the like. Also, the first unit may receive the encrypted context data via an indiscriminate broadcast from the second unit.

Block 315 includes the first unit communicating directly and discriminatorily with the second unit. This may be based on the first unit making a comparison based on the sensed data from the first unit and the decrypted context data from the second unit. This may be further based on the second unit's ID being bound or coupled in some manner to the decrypted context data. If there is a sufficient match, the first unit may communicate directly with the second device based on the comparison. For example, the two devices may engage in SMS communication. As another example, the first unit may wrap a session key with the shared key (received from STB 105), transmit the session key to the second unit, and then communicate securely with both units having the session key.

Thus, as seen in FIG. 3 there need not be reciprocity for every stage between the first and second units. For example, the first unit may not broadcast its sensed information, even though the second unit broadcasts its sensed information. Also, in some embodiments only one of the two units correlates the context information from the first and second units.

In embodiments, the second unit may be more involved than as is the case with FIG. 3. For example, the first unit may wrap a feature (based on sensory information detected by the first unit) with the encryption key and send that information to the second unit. The second unit may determine if there is a match between the first unit's feature and the second unit's feature. The first unit may then unilaterally and indiscriminately send encrypted data to the second unit with no knowledge of whether the second unit will accept the encrypted data.

As mentioned above, the different types of sensors and the different environmental aspects to sense are many. Along these lines, in an embodiment units 105, 110 may use antennae as respective sensors as described more fully in U.S. patent application Ser. No. 12/999,629, filed Dec. 16, 2010 and entitled "MECHANISM FOR PROXIMITY DETECTION BASED ON WI-FI SIGNALS".

Specifically, in an embodiment units 105 and 110 may each determine the strength (of a WI-FI signal (the environmental issue to be sensed) and then exchange features based on that strength of signal determination to see if the two similarly located devices received essentially the same strength of signal (indicated the units may indeed be collocated). Signals are not limited to WI-FI but may also include radio based WWAN signals, and the like. Again, the elements to sense and sensors with which to sense are varied.

Figure 4:
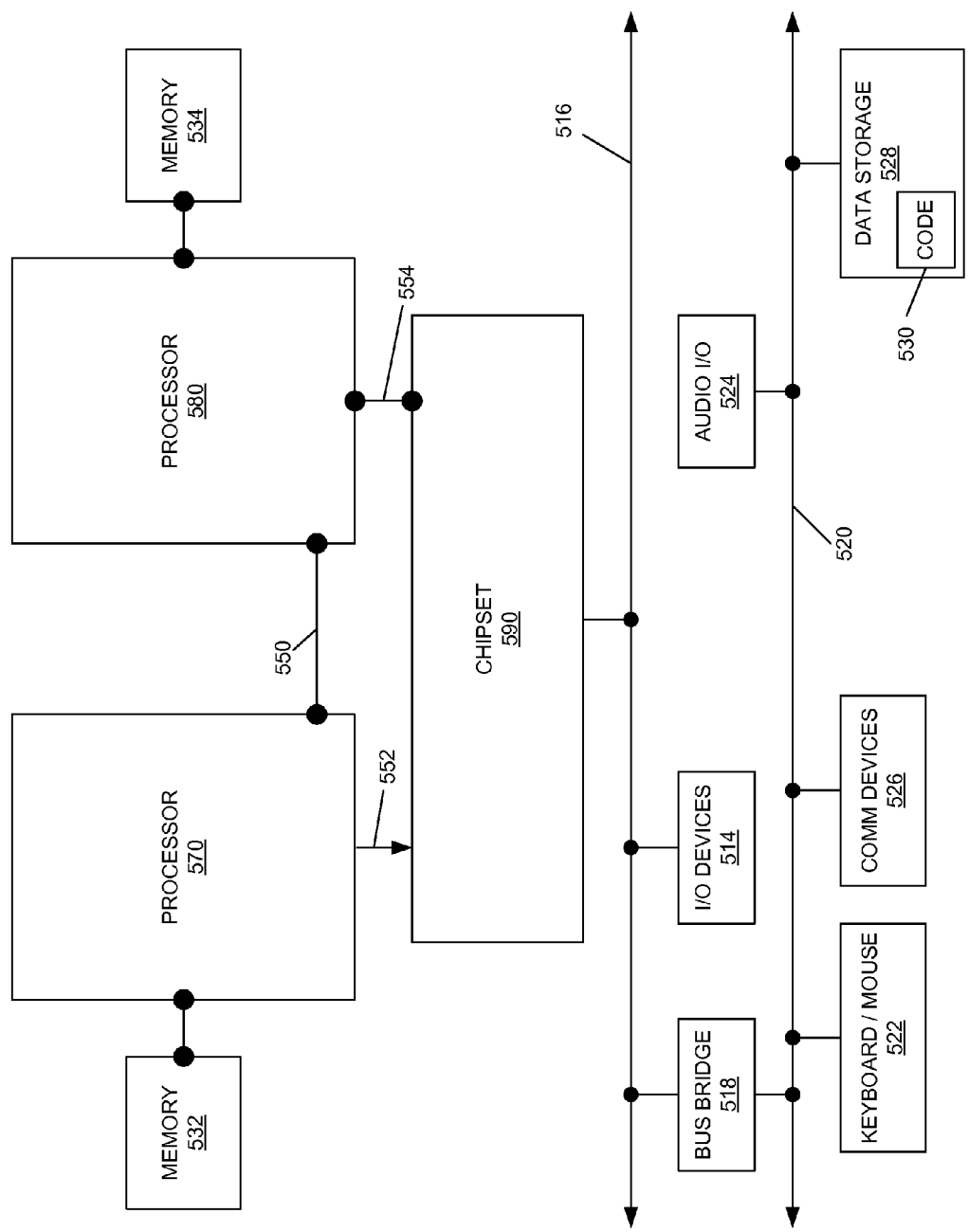
FIG. 4 includes a system for use with embodiments of the invention.

Embodiments may be implemented in many different system types. Referring now to FIG. 4, shown is a block diagram of a system in accordance with an embodiment of the present invention. Multiprocessor system 500 is a point-to-point interconnect system, and includes a first processor 570 and a second processor 580 coupled via a point-to-point interconnect 550. Each of processors 570 and 580 may be multicore processors. The term "processor" may refer to any device or portion of a device that processes electronic data from registers and/or memory to transform that electronic data into other electronic data that may be stored in registers and/or memory. First processor 570 may include a memory controller hub (MCH) and point-to-point (P-P) interfaces. Similarly, second processor 580 may include a MCH and P-P interfaces. The MCHs may couple the processors to respective memories, namely memory 532 and memory 534, which may be portions of main memory (e.g., a dynamic random access memory (DRAM)) locally attached to the respective processors. First processor 570 and second processor 580 may be coupled to a chipset 590 via P-P interconnects, respectively. Chipset 590 may include P-P interfaces. Furthermore, chipset 590 may be coupled to a first bus 516 via an interface. Various input/output (I/O) devices 514 may be coupled to first bus 516, along with a bus bridge 518, which couples first bus 516 to a second bus 520. Various devices may be coupled to second bus 520 including, for example, a keyboard/mouse 522, communication devices 526, and data storage unit 528 such as a disk drive or other mass storage device, which may include code 530, in one embodiment. Further, an audio I/O 524 may be coupled to second bus 520.

Embodiments may be implemented in code and may be stored on a non-transitory storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions. Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered. Components or modules may be combined or separated as desired, and may be positioned in one or more portions of a device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An article comprising a non-transitory medium storing instructions that enable a processor-based first unit to:
   sense the first unit's local surroundings to determine sensed data;
   receive and decrypt encrypted context data transmitted directly from a second unit to the first unit, the second unit being separate from but located nearby the first unit and the context data corresponding to the first unit's local surroundings; and
   assess collective environmental context of the first and second units based on the sensed data and the decrypted context data.

2. The article of claim 1 storing instructions that enable the first unit to receive the encrypted context data via an indiscriminate broadcast from the second unit.

3. The article of claim 2 storing instructions that enable the first unit to encrypt first data, which is based on the sensed data, and indiscriminately broadcast the encrypted first data to the second unit.

4. The article of claim 1 storing instructions that enable the first unit to assess similarity between the sensed data and the decrypted context data and communicate discriminatorily and directly with the second unit based on the assessment.

5. The article of claim 1 storing instructions that enable the first unit to:
   receive an identifier (ID) directly from the second unit; and
   transmit additional data discriminatorily based on the ID.

6. The article of claim 1 storing instructions that enable the first unit to establish a secure channel between the first and second units based on a session key possessed by both of the first and second units and having been originated from one of the first and second units.

7. The article of claim 1 storing instructions that enable the first unit to communicate directly with the second unit based on the sensed data and the decrypted context data; wherein assessing the collective environmental context includes assessing the proximity of the first unit to the second unit.

8. The article of claim 1 storing instructions that enable the first unit to receive an encryption key from a server, which is to wirelessly couple to the first unit, and decrypt the encrypted context data based on the encryption key.

9. A computer-implemented method comprising:

with a first unit, (a) receiving an encryption key from a remotely located key provisioning unit; (b) sensing first local environmental sensory data and determining a first feature based on the first sensed local environmental sensory data; (c) encrypting the first feature based on the encryption key and broadcasting the encrypted first feature directly to a second unit; (d) receiving an encrypted second feature directly from the second unit, the second unit being separate from but locally nearby the first unit and the second feature being based on the first local environmental sensory data; and (e) based on the first and second features, communicating additional data directly between the first and second units;

wherein the first unit includes a first identifier (ID) to identify the first unit and the second unit includes a second ID to identify the second unit.

10. The method of claim 9, wherein:

the remotely located key provisioning unit includes a server wirelessly coupled to the first and second units;

the first local environmental sensory data includes one of auditory, visual, pressure, vibratory, location, and tactile sensory data;

the first unit's ID is one of a telephone number, an e-mail address, an instant message address, a Media Access Control address, and a random nonce; and the first feature includes a first feature vector and the second feature includes a second feature vector.

11. The method of claim 9 including:

the first unit indiscriminately broadcasting the encrypted first feature; and the first unit receiving the encrypted second feature directly from the second unit via an indiscriminate broadcast from the second unit.

12. The method of claim 9 including the first unit (a) comparing the first and second features, and (b) directly and discriminately communicating with the second unit based on the comparison.

13. The method of claim 9 including the first unit (a) transmitting the first unit's ID to the second unit and receiving the second unit's ID from the second unit; and (b) transmitting the additional data discriminatorily and directly to the second unit based on the second unit's ID.

14. The method of claim 9 wherein broadcasting the encrypted first feature includes transmitting the first unit's ID to the second unit, the method further including the first unit (a) receiving the second unit's ID from the second unit, and (b) transmitting unencrypted data between the first and second units based on the first unit receiving the second unit's ID and the first unit transmitting the first unit's ID to the second unit.

15. The method of claim 9, wherein the remotely located key provisioning unit includes a server wirelessly coupled to the first unit.

16. An apparatus comprising:

a first unit including a memory coupled to a processor, the first unit to (a) sense the first unit's local surroundings to determine sensed data; (b) receive, directly from a second unit, encrypted context data into the memory; (c) decrypt the encrypted context data; and (d) based on the sensed data and the decrypted data, assess proximity of the first unit to the second unit;

wherein in a first configuration the second unit is to be separate from but locally nearby the first unit and the context data is to correspond to the first unit's local surroundings.

17. The apparatus of claim 16, wherein the first unit is to receive the encrypted context data from the second unit via an indiscriminate broadcast from the second unit.

18. The apparatus of claim 16, wherein the first unit is to:

encrypt first data, which is based on the sensed data;

indiscriminately broadcast the encrypted first data to the second unit; and indiscriminately receive the encrypted context data from the second unit.

19. The apparatus of claim 16, wherein the first unit is to assess a relationship between the sensed data and the decrypted context data and communicate directly and discriminately with the second unit based on the assessment.

20. The apparatus of claim 16, wherein the first unit is to:

receive an identifier (ID) directly from the second unit; and transmit additional data discriminatorily based on the ID.

* * * * *